Feb. 3, 1948.    R. C. ARCHIBALD    2,435,379
PREPARATION OF SPHEROIDAL CATALYST
Filed Dec. 14, 1943    3 Sheets-Sheet 1
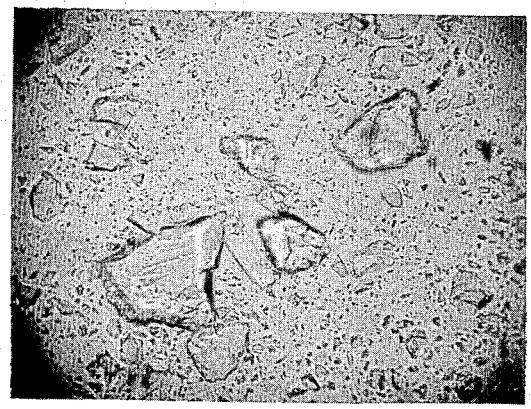
Fig. I
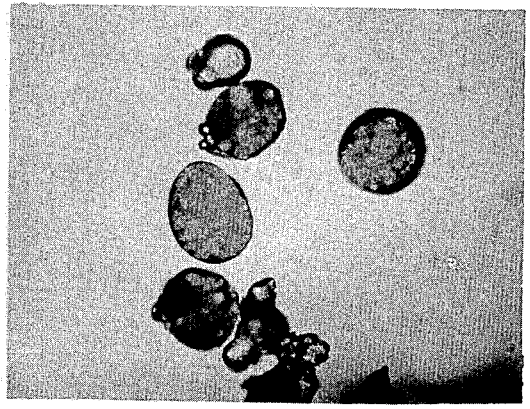
Fig. II
Inventor: Raymond C. Archibald
By his Attorney:

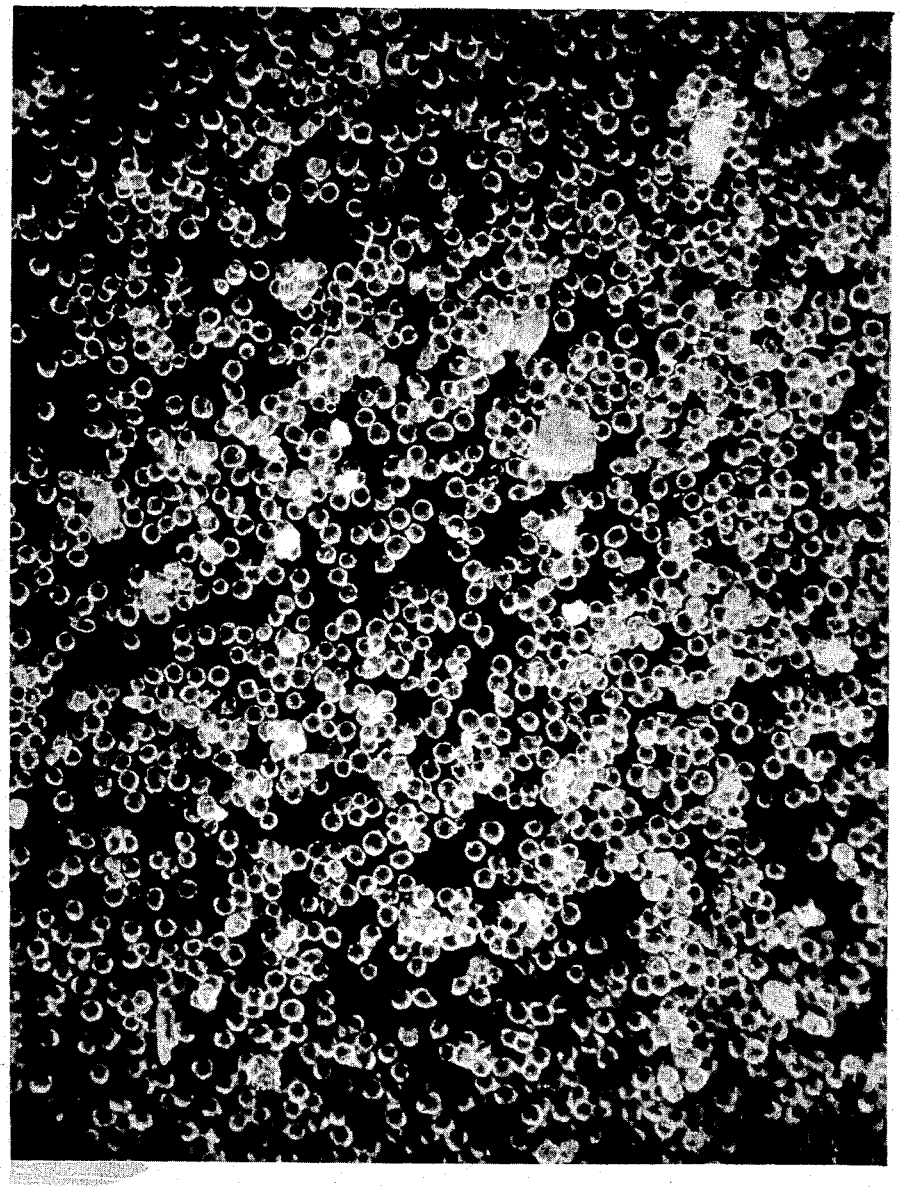
Fig. III

Feb. 3, 1948.  R. C. ARCHIBALD  2,435,379
PREPARATION OF SPHEROIDAL CATALYST
Filed Dec. 14, 1943  3 Sheets-Sheet 3
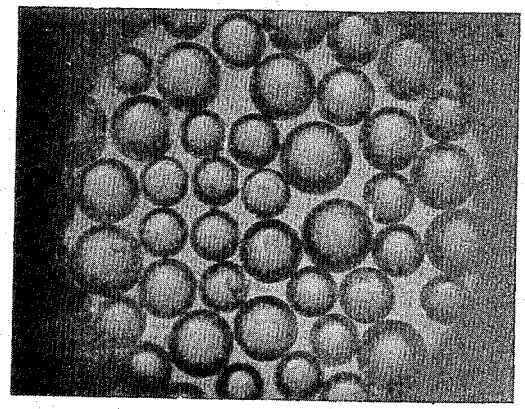
Fig. IV
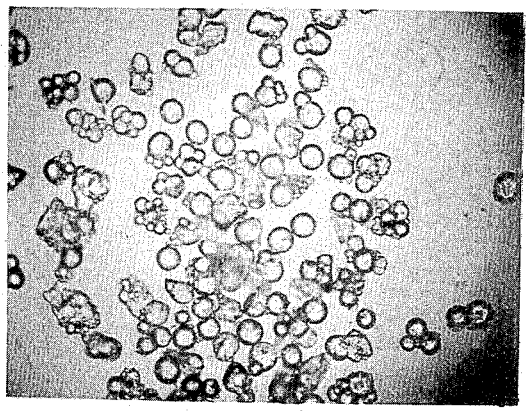
Fig. V
Inventor: Raymond C. Archibald
By his Attorney:

Patented Feb. 3, 1948

2,435,379

UNITED STATES PATENT OFFICE 2,435,379

PREPARATION OF SPHEROIDAL CATALYST

Raymond C. Archibald, Berkeley, Calif., assignor to Shell Development Company, San Francisco, Calif., a corporation of Delaware Application December 14, 1943, Serial No. 514,295

4 Claims. (Cl. 252—259.2)

The present invention relates to moving-bed catalytic processes and more particularly to the preparation of catalysts suitable for use in carrying out chemical conversions and reactions by such processes as, for example, the cracking, reforming, hydrogenation, dehydrogenation, cyclization, aromatization, alkylation, isoforming, polymerization, desulfurization, etc., of petroleum products, coal-tar products and allied materials.

In mechanical aspects these catalytic processes have taken two forms, which are designated primarily with respect to the particular system for the physical manipulation of the catalyst. In the fixed-bed types of processes, the catalyst in the shape of pellets or granules is arranged as a fixed layer within a container in such a manner that a stream of hydrocarbon or other reactant material may be passed therethrough, usually in the vapor phase. Conditions of temperature, pressure and flow rate are adjusted to bring about the desired conversion of the reactant material. After a period of time which varies with the particular conditions of the process, the catalyst becomes deactivated and the process is interrupted in order to regenerate the catalyst.

In moving-bed types of catalytic processes, catalyst particles are passed in continuous concurrent or countercurrent contact with fluid material which is to be reacted, the catalyst particles and reaction products are separated and the catalyst is regenerated in a separate zone before being returned to the reaction chamber. Catalytic processes of this type are generally divided into two classes, those wherein catalyst particles of the order of 1 mm. or more, the so-called "granular" catalyst processes, and those processes wherein catalyst particles of the order of 200 microns and finer—commonly known as "fluid catalysts"—are employed.

The present invention is concerned particularly with moving-bed catalysts, and this term for the purpose of the present specification is intended to include those catalysts which are transported through a reaction system by means of a liquid, gas or vapor stream or which are mechanically conveyed or drop through parts of a reaction system. For purposes of illustration the invention will be described with particular reference to the preparation of catalysts commonly termed "fluid" or "dust" catalysts, such catalyst being generally transported within a reaction system by means of a fluid.

In a fluid catalyst process "fines," i. e., small particles of catalyst of a size less than about 10 microns, are disadvantageous for several reasons. They are difficult to remove from the regeneration gas and hydrocarbon vapor stream for recycle purposes, a large portion of them passing out of the system with the exit gases. Further, those fines which are recovered from the gas and vapor streams tend to become segregated from the bulk of the catalyst and indefinitely held in equipment designed to recover and recycle catalyst particles within the system. A serious disadvantage of both the granular and fluid catalyst moving-bed processes lies in the fact that excessive quantities of fines are produced in preparing and using the catalyst particles. Fluid type catalysts, for example, are usually prepared by grinding relatively large solid masses of catalytic material, during which operation quantities of fines are produced, and all the particles are irregular in shape. During the operation of such processes, further large quantities of fines are produced within the system as a result of the violent attrition to which the catalyst particles are subjected. Much of this degradation is due to the jagged, irregular shape of the catalyst particles. In standard commercial scale fluid catalyst petroleum cracking plants of approximately 20,000 barrels per day capacity, for example, catalyst losses as high as 20,000 pounds per day have occurred as a result of fines passing out of the system with exit gases. Under optimum operating conditions with a minimum of mechanical losses, 4,000 pounds per day of fresh catalyst are normally added to such systems to replace losses of catalyst as fines.

It is an object of the present invention to provide moving-bed type catalysts which are highly resistant to degradation due to attrition. Another object is to provide moving-bed type catalysts which are relatively non-abrasive with respect to the equipment in which they are employed. A further object of the invention is to provide methods whereby such catalysts may be prepared with a minimum of fines production. Other objects, together with some of the advantages to be derived from utilizing the invention, will become apparent from the following detailed description thereof, taken together with the accompanying drawings wherein:

Figure I is a photomicrograph (140 diameter magnification) of commercial grade, conventional silica-alumina catalyst particles.

Figure II is a photomicrograph (140 diameter magnification) of alumina catalyst particles prepared according to one embodiment of the present invention.

Figure III is a photomicrograph (40 diameter magnification—3.5 diameter photoenlargement) of silica-alumina catalyst particles prepared in the same manner as the particles of Figure II.

Figure IV is a photomicrograph (17 diameter magnification) of silica catalyst particles prepared according to a second embodiment of the invention.

Figure V is a photomicrograph (140 diameter magnification) of silica catalyst particles prepared according to a third embodiment of the invention.

According to the present invention degradation of catalyst particles as used in fluid catalyst processes is reduced to a minimum by the use of spheroidal catalyst particles. Fluid catalysts in the desired spheroidal form may be prepared, for example, by rapidly drying atomized or sprayed droplets of a colloidal suspension of catalytically active material. The term "colloidal suspension" of a catalytically active material is intended to include, for the purpose of the present invention, elements, compounds, and mixtures of elements and/or compounds having catalytic properties, as well as mixtures of the same with non-catalytic materials, when in the following forms: hydrogels, hydrosols, gels or sols in other than aqueous media, gelatinous precipitates, mixtures of two or more co-existing gels and/or sols in the same or compatible media, mixtures of gels and/or sols and non-colloidal precipitates and mixtures of gels and/or sols with ions. When non-colloidal precipitates are employed as part of the catalyst composition, the particles thereof must be small enough to pass through the atomizing nozzle without clogging the same.

Spheroidal catalysts suitable for use in fluid catalyst processes may be prepared according to the present invention from such materials as the oxides, sulfides and oxy-sulfides, of iron, chromium, bismuth, boron, aluminum, gallium, copper, nickel, beryllium, titanium, indium, zirconium, thorium, cerium, scandium, vanadium, manganese, magnesium, silicon, lanthanum, germanium, tin, tantalum, molybdenum, tungsten or the like, and mixtures of the same.

As a generally suitable method of preparing the present improved fluid catalysts, at least one major constituent of the catalyst is prepared as a sol or gel or gelatinous precipitate, by proper mixing of the necessary ingredients. Other components, when employed, are preferably added as sols or gels, which may be formed concomitantly with the first sol or gel, mixed with it later, or formed on it, or they may be incorporated as non-colloidal precipitates or as ions whether adsorbed on the gel or dissolved in the dispersing medium. The fluid or gelatinous preparation containing the desired element or elements may then be sprayed and dried to form the desired spheroidal catalyst particles. In some cases a change from gel to sol or sol to gel may be made by the addition of a suitable peptizing or coagulating agent. Such changes may be desirable to improve the spraying characteristics or as a method of controlling particle size.

Certain dried sols may have different characteristics from dried gels of the same chemical composition. In such cases, where the gel characteristics are desired, an alternate procedure is to spray the sol into an atmosphere containing a suitable coagulating agent so that the gel is formed in small droplets and dried in spheroidal shape in a single operation. In another alternate procedure a solution of one of the components used to form a gel or sol may be sprayed into an atmosphere of the other component in gas or vapor form, whereupon the reaction forming the sol or gel takes place in the sprayed droplets of the first component, and the sol or gel is thus formed and dried to the desired spheroidal particles in a single operation.

In preparing such catalysts it is often found that if the ingredients are not taken in exactly the proper proportions and concentrations, instead of a sol or gel, the initial reaction product may be a non-colloidal precipitate or a mixture of a precipitate and a sol or gel. The sol in this mixture may coagulate to the gel form, thereby giving a gelatinous mass containing both gel and precipitate. Thus, during the preparation of some gels it is possible to obtain an intermediate reaction product in any one of three forms, namely a gel exclusively, a non-colloidal precipitate exclusively, or a sol exclusively; or mixtures of two or more of these forms may be obtained. In some cases it may be found that neither the precipitate alone nor the mixture of precipitate and gel or sol, after processing, yields an end product having as desirable properties as catalysts prepared entirely through the medium of a gel or sol.

For this reason, it may be found desirable to peptize the gel, particularly if the same contains appreciable amounts of precipitate, prior to the spray drying operation. This will be found particularly desirable in preparing catalysts containing as an essential ingredient the oxides of iron, aluminum, vanadium, copper, nickel, titanium, thorium, manganese, chromium, zirconium and others tending normally to produce undesirable quantities of precipitate rather than gels or sols. The preferred peptizing agents include, among others, suitable organic acids such as, for example, acids of the aliphatic series including formic acid and acetic acid, substituted aliphatic acids such as chloracetic acid, etc., as well as mineral acids, such as sulfuric acid and hydrochloric acid, suitable sources of hydroxyl ions such as sodium hydroxide and ammonium hydroxide, inorganic carbonates such as alkali metal carbonates, as well as organic salts such as ammonium acetate, which is a particularly effective peptizing agent.

In preparing some of the hydrous oxide gels, such as those of silicon, titanium, germanium, tin, tantalum, molybdenum, tungsten and pentavalent vanadium, best results are obtained by reacting the ingredients capable of forming the desired gel under such conditions as to form a reaction product which is acid.

Other hydrous oxide gels, particularly the oxides of iron, chromium, aluminum, gallium, indium copper, nickel, beryllium, titanium, zirconium, thorium, cerium, scandium, manganese and tetravalent vanadium, may be best prepared by reacting the ingredients capable of forming the desired hydrous oxide gels under conditions whereby gelatinous precipitates are formed which are either acid or alkaline.

Hydrous oxide gels containing two or more oxides of metals or nonmetals, may be prepared by reacting solutions of soluble salts of a plurality of the catalytic materials noted above, with either an alkali or its equivalent or an acid or acidic substance, in such proportions and concentrations as to form a reaction product consisting of a hydrous gel, or a gelatinous precipitate exclusively, or a mixture of a gelatinous precipitate and a hydrous gel which is either acid or alkaline depending upon whether the reaction product is obtainable on the alkaline or acid side.

The hydrous gel, after preparation, is preferably thoroughly washed before further processing, the washing being effected with either cold or hot water or other liquid, and in any suitable manner, as by decantation, on a filter or otherwise. Although a hydrous gel which has been thoroughly washed is generally preferred, it is to be understood that an unwashed or incompletely washed hydrous gel or precipitate may also be used, and the finished catalyst particles may instead be washed and dried in a kiln or the like. After-washing of this nature is usually not so efficient, however, as washing of the hydrous gel. The washing step may be eliminated altogether in those instances wherein undesirable impurities are not present in the hydrous gel after its preparation or when the impurities are of a volatile nature as, for example, in the preparation of aluminum oxide gels wherein aluminum nitrate and ammonium hydroxide are reacted to form the gel, the impurities in this instance being volatile nitrate and ammonium compounds which may be removed in the spray drying step or in a following calcination step.

In those instances wherein a peptizing agent is employed the agent is preferably added after the washing step of the process in order to obtain catalysts of greatest efficiency.

Hydrous gels to be used in preparing the catalysts may be prepared by any of the suitable methods known to the art, as shown in the following illustrative examples:

Example I

A stannous oxide gel may be prepared by adding an aqueous solution containing from 3% to 7% by weight of sodium stannate to an acid solution, for example hydrochloric or sulfuric acid, until the concentration of the hydrogen ions coming from the acid in this mixture is within the range of one-tenth to five-tenths mols per liter, vigorous agitation being maintained during the reaction. The sol thus formed will coagulate within a short period of time after the reaction has been completed to form the desired hydrous gel.

Example II

Using sodium titanate as a starting material, a hydrous titanate gel may be prepared by the method of Example I.

Example III

A hydrous tungsten oxide gel may be prepared by adding a solution of sodium tungstate containing from 3% to 6% by weight of the salt to a solution of an acid, such as sulfuric or hydrochloric for example, and stirring vigorously until a precipitate forms. This requires only a small amount of acid. The reaction mass is then further agitated until the precipitate dissolves, whereupon more acid is added, the total acid used being sufficient to provide a final acidity of from 0.1 N to 0.5 N after the reaction has gone to completion. With this acidity, the reaction mixture, or sol, will coagulate to form a hydrous tungstate gel within a period of less than 30 minutes at room temperature.

Example IV

A hydrous aluminum oxide gel may be prepared by mixing equal quantities of an aqueous solution of aluminum sulfate containing between approximately 5% and 10% by weight of the salt, with a 1 N solution of an alkali, such as sodium hydroxide or ammonium hydroxide, for example. The reaction is preferably carried out at a temperature of the order of 0° C. to −5° C. and under conditions of agitation. A hydrated gelatinous alumina results.

Example V

Alumina gels may also be prepared by the method (Examples I and II) described above in relation to stannate and titanate gels, sodium aluminate being used as a starting material.

Example VI

A silica gel may be prepared by vigorously mixing together a 10% solution of hydrochloric acid and a solution of sodium silicate having a specific gravity within the range of 1.1 to 1.3, a sol resulting which coagulates to form the gel within a period of 30 to 60 minutes at a temperature of 50° C.

When, for example, desired hydrous gel or sol, mixture of hydrous gels or sols, or mixture of gels, sols and/or precipitates, has been obtained, it is placed in suitable spraying or atomizing equipment and discharged as a mist into an atmosphere maintained at a sufficiently high temperature to insure rapid drying at least to the point whereat the spheroidal shape of the mist particles is stabilized. The amount of water which must be removed from the hydrous gel particles to accomplish such stabilization will be course vary with the particular gel at hand and is dependent upon the water content of the gel as well as its inherent properties of fluidity, thixotropy, etc. In many instances it will be found both desirable and preferable to dry the catalyst particles completely in this step of the process. On the other hand it may be necessary or desirable in other cases to partially dry the particles in this step to a point where their shape remains fixed and then complete the dehydration in a rotary kiln or the like. The principal criterion is that the particles should be sufficiently dehydrated to overcome their fluid characteristics and to maintain their spheroidal shape when collected either for use or for further dehydration.

For use in fluid catalyst systems, it will be found preferable to adjust the particle size of the mist to a point whereat the catalyst particles are of the order of approximately 10 to 200 microns in diameter when completely dehydrated, or at least dehydrated to an extent suitable for use in the particular application intended. Although catalysts prepared according to the present invention are intended primarily for use in catalytic processes wherein the catalyst particles are transported through the system by means of a gas or vapor, it will be found advantageous in many instances to employ these catalysts in processes wherein the catalyst particles are transported by means of a liquid, as in the various catalyst slurry processes known to the art. For such uses it may be found preferable to employ catalysts having a diameter in excess of 200 microns and up to approximately 3000 microns. The particle size of the catalyst may be adjusted as desired by controlling the conditions of the mist-forming operation, as for example by variations in orifice size in the spray equipment, variations in pressure employed for the spraying, and in those instances where gas or vapor atomization is employed by regulating the quantity of air or other vapor passed to the atomizing nozzle.

Temperatures of the order of 200° F. to 1000° F. for drying the sprayed mist are preferred, although it is evident that in some instances other temperatures may be useful, particularly when it is necessary or desirable to provide a relatively long or short residence time for the catalyst during the drying step. When the catalyst particles are to be only pre-dried during the atomization step and to the point of stability in shape, temperatures appreciably less than 200° F. and as low as prevailing atmospheric temperature may often be employed. In the case of gels or sols formed in other than aqueous media, even lower temperatures may be indicated. As already indicated, it is also within the scope of the present invention to prepare the desired spheroidal catalysts by spraying a mist comprising a catalyst sol into an atmosphere containing an alkaline or acid material, such as ammonia vapor or hydrogen chloride vapor, thus simultaneously forming and dehydrating the corresponding catalyst gel. In a preferred embodiment of this aspect of the invention, a catalyst sol is atomized by means of a suitable alkaline or acid gas or vapor and the resulting mist passed into an atmosphere maintained at drying temperatures, which atmosphere may contain further quantities of a suitable acid or alkaline vapor or gas, if desired. In those instances wherein it is practicable to preheat the sol or the coagulating agent used in the atomization, drying atmosphere temperatures less than approximately 200° F. and up to approximately 1000° F. will generally be found satisfactory. In cases wherein preheating of the sol or atomizing agent is undesirable or impracticable, drying atmosphere temperatures in excess of approximately 1000° F. and up to approximately 1500° F. may be found desirable.

Figures II and III illustrate catalyst particles prepared according to the spray drying technique described above.

In a modification of the procedure outlined immediately above, suitable catalyst particles may be prepared by passing droplets of a catalyst sol through a liquid which is substantially immiscible with the dispersion medium of the sol and which contains a suitable coagulating agent in solution. For example, aqueous acidic alumina sol may be sprayed or dropped into and through a body of hydrocarbon containing ammonia in solution, the ammonia acting to coagulate the sol to a gel. Conversely, a catalyst sol prepared with a hydrocarbon as a dispersing medium may be coagulated by passing droplets of the same through an aqueous solution of a suitable coagulating agent. As another alternative procedure, particularly when relatively small spheroidal particles are desired, an emulsion of the sol in a liquid which is substantially immiscible with the dispersing medium of the sol may be prepared and a suitable coagulating agent added to the emulsion.

Another and particularly suitable method of preparing spheroidal catalyst particles comprises the heat treatment of thermosetting catalyst sols. It has been found that many catalytically active materials, particularly the various metal oxides and sulfides enumerated hereinbefore, when subjected to a sudden temperature change while in the sol form set to a firm gel almost instantaneously. For example, a silica sol prepared as hereinbefore described is stable for a period of days at a temperature of 0° C. However, when subjected to a temperature of 100° C., the sol almost instantaneously sets to a gel.

Advantage may be taken of this phenomenon to prepare spheroidal catalyst particles in the following manner:

*Example VII*

A silica hydrosol is sprayed into a cylindrical vessel approximately 3 feet high containing kerosene or other hydrocarbon material, the kerosene in the upper portion of the vessel being maintained at a temperature of approximately 110° C. and the kerosene in the lower portion of the vessel being maintained at room temperature. As the sol droplets pass through the heated kerosene they are converted to the gel form and are collected from the bottom of the vessel. The thus obtained gel particles are sufficiently stable mechanically to withstand washing, drying or other similar treatment. Upon drying, the particles shrink to approximately ½ their diameter when wet, but retain their spheroidal shape.

The size of the particles may be controlled by variations in the manner in which the sol is sprayed or atomized before introduction to the heated thermosetting medium. If particles of relatively large size are desired, as for example for use in granular moving-bed catalyst systems, the sol may be dropped into the thermosetting medium, rather than sprayed or atomized. Figure IV illustrates typical spheroidal silica catalyst particles prepared by dropping silica sol through kerosene in the manner described above in Example VII.

In a modification of this method, a sol comprising the active ingredient of the catalyst is emulsified with a non-miscible liquid at a temperature at which the sol is stable. The emulsion is then heated to a temperature at which the sol is converted to the gel form and the spheroidal gel particles thus obtained are filtered or otherwise separated from the remaining liquid, washed and dried. Figure V illustrates typical catalyst particles prepared by emulsifying a hydrous silica sol in kerosene and thereafter increasing the temperature within the emulsion to a point whereat thermosetting of the sol particles to the gel form takes place. If it is found that the emulsion tends to break before thermosetting of the sol to a gel has taken place, a small quantity of a suitable emulsifying agent may be added to stabilize the emulsion. Further, if it is found that the sol tends to gel during the preparation of an emulsion, or prior to passing through a liquid thermosetting medium, a peptizing agent, as for example acetic acid, should be added to the sol. In preparing the emulsion care should be taken, of course, to insure that the sol is the internal phase of the emulsion, i. e., the catalyst sol particles form a suspension of discrete particles within the dispersion medium. The particle size in this instance may also be adjusted as desired, as for example by the degree and intensity of agitation employed in preparing the emulsion, the type of emulsifying agent utilized, the temperature of the ingredients emulsified, etc.

The thermosetting temperatures to be employed for the purposes set forth above will, of necessity, vary with the particular catalyst sol used in preparing the catalyst particles and should be determined experimentally in each instance. In general, it will be found that the most suitable temperature is one at or near the boiling point of the dispersion medium used in preparing the sol. For example, when using hydrous sols, temperatures within the approximate range of 90° C. to 110° C. are preferred. Care should be taken, however, to avoid excessively high temperatures in order to prevent rupture of the sol particles during the thermosetting phenomenon by rapid evolution of the dispersion medium.

It will at times be found desirable to combine the two procedures disclosed above, i. e., preparation of spheroidal catalyst particles, by passing droplets of a catalyst sol through a liquid medium containing a coagulating agent and the thermosetting processes. Thus, if it is found that the time required for the thermosetting of a particular sol is normally undesirably protracted, a coagulating agent may be added to the thermosetting medium to accelerate the coagulation. In the variation of the thermosetting procedure wherein an emulsion of the sol and the thermosetting medium is prepared, it is preferable to add the coagulating agent after the emulsion has been prepared and either before or during the heating operation. Also, when the liquid coagulation technique is employed, coagulation of the sol particles to the corresponding gel may usually be accelerated, if desired, by heating the liquid through which the sol particles are passed.

The gel particles produced by the above thermosetting and liquid coagulation techniques will be found to contain substantially the same quantity of dispersion medium as the sol droplets from which they are produced, i. e., these precedures do not normally involve appreciable removal of the dispersion medium from the droplets in forming the gel particles, in contradistinction, for example, to the spray drying techniques described hereinbefore.

The thermosetting methods described above are particularly adapted to the preparation of spheroidal catalyst particles containing as an essential ingredient the oxides of silicon, aluminum, chromium, titanium, vanadium and iron and mixtures of the same in various proportions. The catalytically active material is processed to prepare a stable hydrous or non-hydrous sol and then emulsified with or passed through a liquid medium maintained at thermosetting temperatures, a liquid medium being selected which is not miscible with the dispersion medium used in preparing the sol. If desired, various amounts of catalyst-containing gel may also be mixed with the sol prior to forming spheroidal droplets of the sol and subjecting the same to contact with a liquid medium at thermosetting temperatures.

The present application is a continuation-in-part of my co-pending application, Serial No. 492,189, filed June 23, 1943, now abandoned.

I claim as my invention:

1. In a method for preparing substantially spheroidal catalyst particles suitable for use in moving-bed catalyst reaction systems, the steps of contacting an acidic, inorganic sol capable of forming a gel in the form of dispersed droplets with a body of liquid substantially immiscible with said sol, said liquid containing ammonia as a coagulating agent in solution, and maintaining said droplets dispersed in said liquid for a time sufficient to convert said sol droplets into relatively stable gel particles of spheroidal shape.

2. In a method for preparing substantially spheroidal catalyst particles suitable for use in moving-bed catalyst reaction systems, the steps of contacting an inorganic sol capable of forming a gel in the form of dispersed droplets with a body of liquid susbtantially immiscible with said sol, said liquid containing a coagulating agent in solution, and maintaining said droplets dispersed in said liquid for a time sufficient to convert said sol droplets into relatively stable gel particles of spheroidal shape.

3. In a method for preparing substantially spheroidal catalyst particles suitable for use in moving bed catalytic reaction systems, the steps of adding a mineral peptizing acid to an inorganic hydrosol capable of forming a gel at a temperature at which said sol is relatively stable said peptizing acid producing an acid acting hydrosol, contacting the resulting hydrosol in the form of dispersed droplets with a body of hydrocarbon liquid containing a coagulating agent, and maintaining said hydrosol and hydrocarbon liquid in contact at a thermosetting temperature until said hydrosol droplets are converted into relatively stable gel particles of spheroidal shape.

4. The method according to claim 3 wherein the hydrosol is sprayed into the hydrocarbon liquid.

RAYMOND C. ARCHIBALD.

REFERENCES CITED

The following references are of record in the file of this patent:

UNITED STATES PATENTS

| Number | Name | Date |
|---|---|---|
| 1,297,724 | Patrick | Mar. 18, 1919 |
| 1,508,118 | Govers | Aug. 26, 1924 |
| 1,614,636 | Wachtel | Jan. 18, 1927 |
| 1,755,496 | Behrman | Apr. 22, 1930 |
| 1,806,663 | Behrman | May 26, 1931 |
| 1,843,576 | McClure | Feb. 2, 1932 |
| 1,900,859 | Connolly et al. | Mar. 7, 1933 |
| 1,949,360 | Schorger | Feb. 27, 1934 |
| 1,985,343 | Connolly et al. | Dec. 25, 1934 |
| 2,085,129 | Stoewener | June 29, 1937 |
| 2,088,281 | Smith | July 27, 1937 |
| 2,215,305 | Voorhies | Sept. 17, 1940 |
| 2,258,786 | Melaven | Oct. 14, 1941 |
| 2,272,301 | Kinneberg | Feb. 10, 1942 |
| 2,282,922 | Ahlberg et al. | May 12, 1942 |
| 2,283,172 | Bates | May 19, 1942 |
| 2,284,248 | Baker et al. | May 26, 1942 |
| 2,289,918 | Lee et al. | July 14, 1942 |
| 2,299,768 | Shabaker | Oct. 27, 1942 |
| 2,302,297 | Connolly | Nov. 17, 1942 |
| 2,384,943 | Marisic | Sept. 18, 1945 |
| 2,384,946 | Marisic | Sept. 18, 1945 |
| 2,387,596 | Marisic | Oct. 23, 1945 |
| 2,418,232 | Marisic | Apr. 1, 1947 |